March 28, 1933.  E. F. WARREN ET AL  1,903,017
TRANSMISSION LOCK
Filed Nov. 30, 1927  2 Sheets-Sheet 2
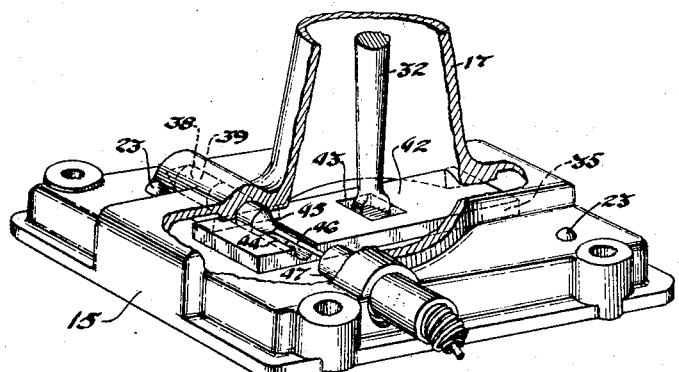
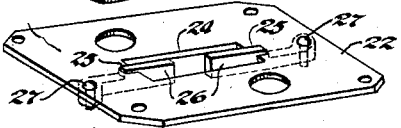
Fig. 5
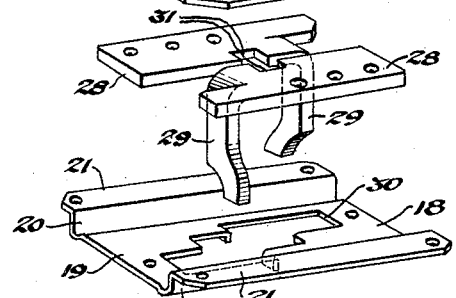
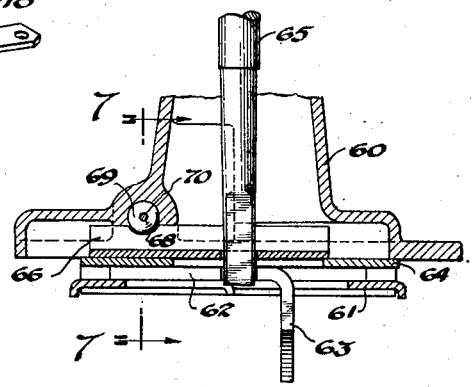
Fig. 6
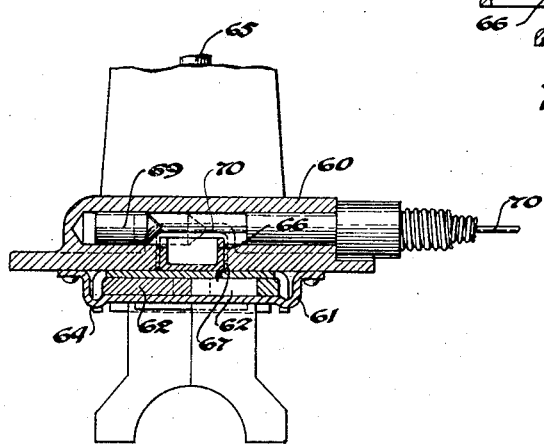
Fig. 7
Inventor
Herman Schwarze &
Edward F. Warren
By
Blackmore, Spencer & Hulse
Attorneys Patented Mar. 28, 1933

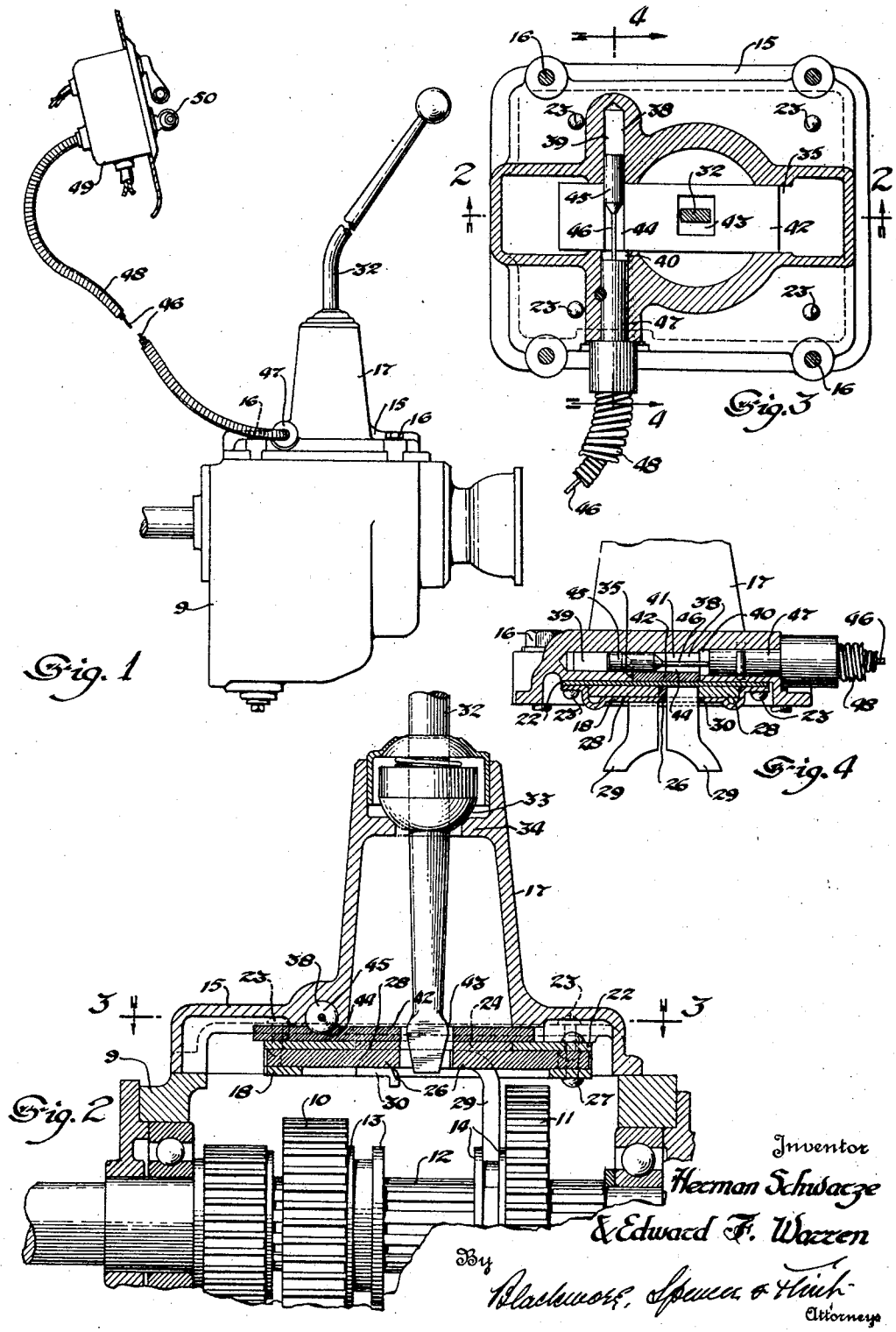

1,903,017

UNITED STATES PATENT OFFICE

EDWARD F. WARREN AND HERMAN SCHWARZE, OF BIRMINGHAM, MICHIGAN, ASSIGNORS TO GENERAL MOTORS CORPORATION, OF DETROIT, MICHIGAN, A CORPORATION OF DELAWARE

TRANSMISSION LOCK

Application filed November 30, 1927. Serial No. 236,832.

This invention relates to transmission locks for automotive vehicles.

It is an object of the invention to provide a new and useful transmission lock.

More specifically it is an object of the invention to provide means whereby the change speed gearing operating mechanism of an automotive vehicle may be locked to prevent unauthorized use of the vehicle.

It is another object of the invention to so construct and arrange the transmission locking means that it may be operated by the operation of the ignition switch of the vehicle.

Other objects of the invention will appear in the course of the following description of the embodiments of my invention shown in the accompanying drawings. In the drawings:

Figure 1 is a somewhat diagrammatic side elevation of the transmission and the ignition switch of an automotive vehicle and the connection between the two whereby the transmission lock may be operated by the operation of the ignition switch.

Figure 2 is a vertical longitudinal section through the transmission case taken on the line 2—2 of Figure 3.

Figure 3 is a section on the line 3—3 of Figure 2.

Figure 4 is a section on the line 4—4 of Figure 3.

Figure 5 is an exploded perspective view of the transmission case cover and associated parts with parts of the cover broken away.

Figure 6 is a longitudinal section through a gear case cover and associated parts showing the application of a modified form of my invention to a second form of change speed gearing operating means.

Figure 7 is a section on the line 7—7 of Figure 6.

Referring to Figures 1–5 of the drawings the reference character 9 indicates the transmission case of an automotive vehicle within which are located the gears constituting a three-speed forward and one-speed reverse transmission. For the purposes of this case, it is necessary to consider only the gears 10 and 11 which are mounted on and splined to the shaft 12 so that either may be slid independently of the other in either direction longitudinally of the axis of the shaft. Integral with the gear 10 is a pair of spaced collars 13 and integral with the gear 11 is a pair of spaced collars 14.

The transmission case is provided with a cover 15 which is secured thereto by the screws 16. The cover 15 is provided with a central opening which is surrounded by an upwardly projecting frusto-conical collar or elongated circumferential flange 17 integral therewith forming what is commonly termed a dome.

The reference character 18 indicates a supporting member which consists of a main or web portion 19 provided with an upstanding flange 20 on each of its longitudinal edges and with a horizontal flange extending outwardly from the upper edge of each of the upstanding flanges. Resting on each of the flanges 21 and extending therebetween is a cover plate 22. Rivets 23 which pass through the flanges 21, through the edges of the cover plate and through the cover 15 secure the cover plate 22 and the supporting member 18 together and to and against the underside of the cover 15 with the channel of the member 18 extending longitudinally thereof.

The cover plate 22 is provided with a rectangular central opening 24 substantially concentric with the opening in the cover 15. Extending into the cover plate from each end of the opening 24 is a notch 25. A pair of dividers 26, one extending from each end of the member 18 and positioned centrally between the flanges 20, lie in the space between the main portion of the member 18 and the cover plate 22. Each of these dividers is secured at its outer end to the plate 22 and to the main portion of the member 18 by means of a rivet 27 and extends inwardly having a deepened portion entering the notch 25 and then the opening 24. As can clearly be seen from the drawings, the dividers are spaced apart a considerable distance at their juxtaposed ends.

Slidably mounted, one on each side of the dividers, in the space between the cover plate 22 and the main portion of the member 18 is a pair of plates 28 each of which is provided with a prong 29 extending through an opening 30 in the bottom of the main portion of the member 18 and engaging between the pair of collars on one of the gears 10 and 11. It will be noted that the opening 30 is so shaped as to limit the sliding movement of each of the plates longitudinally of the member 18. A notch 31, in length substantially equal to the distance between the adjacent ends of the dividers 26, is cut into the inner side of each of the plates 28 at a point substantially midway between its ends.

The gear shift lever 32 extends downwardly into the dome 17. To the upper end of the portion of the lever 32 which is within the dome, there is secured a bearing member 33 having a lower surface shaped like a portion of the surface of a sphere and seated in a correspondingly shaped socket 34 formed with the dome. The lower end of the gear shift lever extends down into the opening 24 in the cover plate 22 and therethrough, resting, when in neutral position, partly between the ends of the dividers 26 and partly in both of the notches 31.

In neutral position, the gear-shift lever is in the position described in the last paragraph and the notches 31 are directly opposite each other. To shift one of the gears 10 and 11 longitudinally on the shaft 12 assuming that the gear shift lever is in neutral position, it is obvious that it is only necessary to rock the gear-shift lever 32 in the proper direction laterally and then forwardly or rearwardly which latter motion will, of course, cause longitudinal sliding movement of one of the plates 28 which, through the medium of the attached prong 29 and one of the pairs of collars 13 and 14, will accomplish the desired result.

In order to prevent unauthorized use of the vehicle, we provide means whereby the gear-shift lever 32 may be locked in neutral position so that the engine cannot be connected to the drive shaft by unauthorized persons. In order to accomplish this, we provide in the under side of the cover 15 and extending longitudinally and centrally thereof above the plate 22, a slot 35 which is relatively narrow as compared with the width of the cover. Forwardly of the dome 17 a transverse bore 38 which extends from one lateral edge of the cover 15 to a point adjacent the other lateral edge thereof is provided. A segment (preferably of less than 180° of arc length) of the intermediate portion of the bore is cut off by the slot 35 which thus divides the bore 38 into opposed cylindrical portions 39 and 40 in the portions of the cover on the opposite sides of the slot 35 joined by a slot 41 shaped in cross section like a segment of a circle. A plate 42 of substantially the same thickness as the depth of the slot 35 rests on the top of the plate 22 and is mounted in the slot 35 so as to be slidable longitudinally but not transversely therein. The plate 42 is provided between its ends with an aperture 43, in width substantially equal to that of the opening 24 in the cover plate 22, and in length substantially equal to the distance between the juxtaposed ends of the dividers 26, through which the lower end of the gear shift lever 32 projects. As is obvious from a consideration of the length of the aperture 43 and the size of the portion of the gear shift lever passing therethrough, the latter cannot be rocked longitudinally without moving the plate 42 longitudinally in the slot 35. In the top of the plate 42 extending transversely from one edge to the other thereof and spaced from the aperture 43 is provided a slot 44 of the same size and shape as the portion of the bore 38 cut off by the slot 35 and adapted to register with the slot 41 so as to provide a continuous cylindrical bore extending from one side of the cover 15 to adjacent the other side thereof when the gear shift lever is in neutral position.

Slidably mounted in the portion 39 of the bore 38 and of such length that it can be completely enclosed therein is a cylindrical plunger 45.

As has been stated, when the gear shift lever is in neutral position the slots 44 and 41 are in registration. It is obvious that the gear shift lever can be locked in this position by moving the plunger 45 partially or wholly into the cylindrical bore whose upper part is formed by the slot 41 in the cover 15 and whose lower part is formed by the slot 44 in the plate 42. Since, as is obvious from the drawings, to move the gear shift lever out of neutral position the plate 42 must be slid longitudinally in the slot 38 and since when the plunger 45 is in the above described position the plate 42 cannot be slid in the slot 38, it is obvious that under this condition the gear shift lever is effectively locked in neutral position. To unlock the gear shift lever so that the gears may be shifted, it is only necessary to move the plunger 45 back until it lies wholly within the portion 39 of the bore 38.

The end of a piece of Bowden or other stiff wire 46 is secured to the inner end of the plunger 45 and extends therefrom through the slot 41 and through a bushing 47 in the portion 39 of the bore 38 to the outside of the transmission case cover. Secured to the bushing 47 and having a bore communicating with the bore in the bushing is a piece of semi-flexible tubing 48 which extends to and opens into the ignition lock case 49. Through the bore in the tubing, the wire 46 extends into the ignition lock case in which means are provided by which the wire is caused to slide longitudinally in the tubing and move the plunger 45, assuming the gear shift lever is in neutral position, partially or wholly into the bore 41—44 to lock the gear shift lever in this position when the ignition key 50 is turned to open the ignition circuit and by which the wire is caused to slide longitudinally and withdraw the plunger 45 from the bore 41—44 into the bore 40 to unlock the gear shift lever when the ignition key is turned to close the ignition circuit.

In Figures 6 and 7, the application of a slightly modified form of our lock to the gear shifting mechanism disclosed in the application of P. L. Tenney, Ser. No. 637,230, filed May 7, 1923 is shown. In these figures, the reference character 60 indicates the cover of the transmission case. Secured to the underside of the cover 60 with its channel extending longitudinally thereof is the supporting plate 61. Slidably mounted in the channel of the supporting plate 61 is the pair of plates 62 each carrying a prong 63 projecting downwardly through an opening in the supporting plate and adapted to engage one of the shiftable gears of the transmission. Seated on top of the plates 62 and slidable between them and the lower surface of the cover 60 is the interlocking plate 64. The lower end of the gear shift lever 65 projects downwardly through an opening in the interlocking plate and is adapted to engage either of the plates 62 to shift it forwardly or rearwardly in the channel of the supporting plate in order to shift one of the shiftable transmission gears. To accomplish this shifting of gears it is necessary, as usual, assuming that the gear shift lever is in neutral position, to rock the gear shift lever laterally and then forwardly or rearwardly, the direction of lateral rocking movement and the direction of longitudinal rocking movement depending of course, on the gears which it is desired to bring into mesh.

The means for locking the gear shift lever in neutral position is substantially the same and operates in identically the same manner as that shown and described in connection with the gear shift mechanism shown in Figures 1–5 and includes the locking member 66 slidable between the interlocking plate 64 and the cover 60 in a groove 67 in the latter upon longitudinal rocking movement of the gear shift lever. In this case the locking member is in the form of an upwardly opening channel with the arcuate slot 68 which is adapted to be engaged by the plunger 69 in the form of a notch in one or both of the flanges of the member. The wire 70 by means of which the plunger 69 is adapted to be slid into and out of interlocking relation with the locking member 66 may be operated by any suitable means, such, for instance, as that previously described.

It will be obvious from the foregoing description and the drawings that the change speed gearing operating means cannot be locked when the gear shift lever is not in neutral position. However, if it is desired the device may be arranged so that the operating means can be locked with the gear shift lever in any one of its positions by merely changing the position of the plunger receiving slot in the slidable locking member.

We claim:

1. A cover for a change-speed mechanism case, a supporting plate secured to the cover, a shifter-plate slidably mounted on the supporting plate, means for operating the shifter plate, a channel-shaped locking member adapted to be moved upon movement of the shifter plate in one direction, and means to lock the locking member against movement.

2. In a device of the class described, a supporting member, a supporting plate secured to one side of the member, a shifter plate slidably mounted on the supporting plate, means for operating the shifter plate, a groove in the member, a locking member slidably mounted in the groove and adapted to be slid therein upon movement of the shifter plate in one direction by said means, and means to prevent sliding movement of the locking member.

3. In a device of the class described, a supporting member, a supporting plate secured to one side of the member, a shifter plate movably mounted on the supporting plate between the latter and the member, means for operating the shifter plate, a grove in one side of the member and above the shifter plate, a locking member slidably mounted in the groove and adapted to be slid therein upon movement of the shifter plate in one direction by said means, and means to prevent sliding movement of the locking member.

4. A cover for a change-speed mechanism case, a groove in one side of the cover, a locking member slidable in the groove, a gear-shift lever having a portion adapted to engage the locking member to cause it to slide in the groove upon movement of the lever in one direction, and means to prevent sliding movement of the locking member.

5. In a device of the class described, a supporting member, a groove in one side of the member, a locking member slidable in the groove, a gear-shift lever having a portion adapted to engage the locking member to cause it to slide in the groove upon movement of the lever in one direction, a groove in the locking member extending transversely of the grove in the first-mentioned member, and a plunger slidably mounted in the first-mentioned member and adapted to engage in the groove in the locking member to prevent sliding movement of the locking member.

6. In an automotive vehicle, a supporting member, a groove in one side of the member, a locking member slidable in the groove, a gear-shift lever having a portion adapted to engage the locking member to cause it to slide in the groove upon movement of the lever in one direction, a groove in the first-mentioned member extending transversely of the first-mentioned groove and opening thereinto, a groove in the surface of the locking member adapted to register with the second-mentioned groove when the gear-shift lever is in a predetermined position, and a plunger slidably mounted in the first-mentioned member and adapted to be moved when the gear-shift lever is in the predetermined position to a position in which part of it is located in each of the last-mentioned grooves to secure the locking member against movement.

7. In a device of the class described, a supporting member, a bore extending into the member from one edge thereof to a point adjacent the opposite edge, a groove in one side of the member extending transversely of the bore and cutting off a segment of the intermediate portion of the bore, a locking member slidable in the groove, a gear-shift lever having a portion adapted to engage the locking member to cause it to slide in the groove upon movement of the lever in one direction, a segmental groove in the upper surface of the locking member parallel with the bore in the first-mentioned member and adapted to register with the incomplete intermediate portion of the bore and complement it when the gear-shift lever is in a predetermined position, a plunger slidably mounted in one end of the bore in the first-mentioned member and adapted to be moved, when the gear-shift lever is in the predetermined position, to a position in which a part of it is located in the intermediate, incomplete portion of the bore and part in the groove in the locking member, and means attached to the plunger and extending to the outside of the first-mentioned member whereby the plunger may be shifted from a position in which it is wholly enclosed in the bore in the first-mentioned member to a position in which it interlocks the locking member and the first-mentioned member or vice versa.

8. In a device of the class described, a change-speed mechanism case, gear shifting mechanism within the case, a gear-shift lever for operating the gear-shift mechanism, means for preventing operation of the gear-shift mechanism by the gear-shift lever including a locking plate adapted to slide in one direction and in one plane and a plunger adapted to slide transversely of the locking plate and in a plane substantially parallel to that in which the locking plate slides.

9. A cover for a change-speed mechanism case, a channel-shaped supporting plate, a cover plate, means securing the cover plate rigidly to the flanges of the supporting plate and securing the cover plate and the supporting plate to the cover, a pair of shifter plates mounted in the channel of the supporting plate and adapted to slide longitudinally thereof, means rigidly secured to the cover plate extending into the channel and spacing the two shifter plates apart laterally, a groove in the cover above the cover plate, a locking plate slidable in the groove, a gear-shift lever having a portion extending through the locking plate and adapted to engage one of the shifter plates to move it longitudinally of the channel, and means to lock the locking plate in a predetermined position and thereby prevent longitudinal movement of either of the shifter plates.

10. In a cover for a change-speed mechanism case, gear-shifting mechanism, including two members independently slidable in one direction, supported from the cover, means for operating the gear-shifting mechanism, a locking member movable with respect to both of said members and adapted to be moved in the same direction as one of the members when it is moved, and means to secure the locking member against movement.

11. In a cover for a change-speed mechanism case, gear-shifting mechanism movably supported from the cover, a movable member, means adapted to engage the gear-shifting mechanism to shift the gears and, simultaneously, to engage directly the member to cause movement thereof when the means is moved to shift the gears, and means to secure the member against movement.

12. In a device of the class described, a cover, gear-shifting mechanism movably mounted on the cover, means for operating the gear-shifting mechanism, a locking plate slidably mounted between the gear-shifting mechanism and the cover, and means to secure the locking plate against movement.

13. In a device of the class described, a supporting member, gear-shifting mechanism movably mounted on the supporting member, a locking plate slidably mounted between the gear-shifting mechanism and the supporting member, means extending through the locking plate and adapted to engage the gear-shifting mechanism to shift the gears, and means to secure the locking plate against movement.

14. In a device of the class described, a supporting member, a locking member mounted on the supporting member and adapted to slide in one direction and in one plane, a gear-shift lever having a portion adapted to engage the locking member to cause it to slide upon movement of the lever, a plunger slidably mounted in the supporting member and adapted to slide in a plane substantially parallel to that in which the locking member slides and in a direction transversely of that in which the locking member slides, and a recess in the locking member in which a portion of the plunger is adapted to be received to prevent movement of the locking member.

15. In a device of the class described, a supporting member, a locking member provided with upper and lower surfaces mounted on the supporting member and adapted to slide in one direction with respect thereto, a gear shift lever having a portion adapted to engage the locking member to cause it to slide upon movement of the lever, a notch in one of the above mentioned surfaces of the locking member and extending transversely of the direction of sliding movement of the member, and a plunger adapted to slide in a plane substantially parallel with that in which the locking member slides and having a portion adapted to enter into the notch to prevent movement of the locking member.

16. In a device of the class described, a supporting member, a supporting plate secured to one side of the member, gear-shifting mechanism slidably mounted on the supporting plate, a locking plate slidably mounted between the gear-shifting mechanism and the supporting member, a plate interposed between the gear-shifting mechanism and the locking plate, a gear-shift lever having a portion adapted to engage the locking plate to cause it to slide upon movement of the lever, and means to secure the locking plate against movement.

17. In a case adapted to contain change-speed mechanism, gear-shifting mechanism, means to prevent operation of the gear-shifting mechanism including a member mounted to slide in one direction in a substantially horizontal plane, and a second member mounted to slide in a direction transversely of that in which the first member is adapted to slide and in a substantially horizontal plane and adapted to engage the first member whereby to secure it against movement.

18. In a case adapted to contain change-speed mechanism, gear-shifting mechanism, means for operating the gear-shifting mechanism, a member movable with the last mentioned means, a groove in the case, a groove in the surface of the member adapted to be brought into registration with the groove in the case, and means adapted to be moved to a position in which a portion of it is located in each groove to prevent operation of the gear-shifting mechanism.

19. The invention claimed in claim 18 in which said member includes a flat plate having therethrough an opening through which a portion of the first means passes.

20. A cover for a change-speed mechanism case, a groove in one side of the cover, a locking plate slidably mounted in the groove, a gear-shift lever having a portion adapted to engage the locking member to cause it to slide in the groove upon movement of the lever in one direction, a groove in the locking member extending transversely of the groove in the cover, and a plunger slidably mounted in the cover and adapted to engage in the groove in the locking member to prevent sliding movement of the locking member.

21. In a device of the class described, gear-shifting mechanism, and means to prevent operation of the gear-shifting mechanism including, a flanged member, a recess in the flange of the flanged member, and a member adapted to engage in the recess to prevent movement of the flanged member.

22. In a device of the class described, gear-shifting mechanism, and means to prevent operation of the gear-shifting mechanism including, a channel-shaped member, recesses in the free edges of the flanges of the channel-shaped member, and a member adapted to engag in the recesses to prevent movement of the channel-shaped member.

23. In a device of the class described, gear-shifting mechanism, a channel-shaped locking member, means adapted to operate the gear-shifting mechanism and, simultaneously, to move the locking member, a recess in one of the flanges of the locking member, and a plunger adapted to engage in the recess to prevent movement of the locking member and operation of the gear-shifting mechanism.

In testimony whereof we affix our signatures.

EDWARD F. WARREN.
HERMAN SCHWARZE.